United States Patent Office 3,068,289
Patented Dec. 11, 1962

3,068,289
STABILIZATION OF AROMATIC DIAMINES
Joseph E. Woodbridge, Wynnewood, Pa., assignor to The Atlantic Refining Company, Philadelphia, Pa., a corporation of Pennsylvania
No Drawing. Filed Mar. 8, 1960, Ser. No. 13,430
2 Claims. (Cl. 260—578)

This invention relates to the stabilization of aromatic amines and, more particularly, to a method of improving the oxidation and color stability of aromatic diamines.

Aromatic diamines are particularly useful as chemical intermediates in the preparation of dyestuffs and resins, especially diisocyanate resins. They have also found particular utility as curing agents in the preparation of epoxide resins.

In general, aromatic diamines are light colored or water-white when initially prepared, but when in storage, they tend to take on a definite discoloration. This degradation is exceedingly undesirable, especially when the aromatic diamines are to be employed in the preparation of polymeric materials which when used in a particular application must of necessity be light in color to be commercially acceptable.

The color degradation of aromatic diamines has long been known and many and varied attempts have been made to stabilize them. One method of imparting partial stability to an aromatic diamine is to store them under an inert atmosphere such as nitrogen and in lightproof storage containers. This method is generally unacceptable since the stability is temporary at best and upon further handling or processing this stability is easily lost.

Another method of stabilizing aromatic diamines against color degradation is to add an organic sulfur compound to the aromatic diamine. Typical sulfur compounds which have been used for this purpose include aromatic mercaptans, zinc aromatic mercaptides, zinc salts of aromatic mercaptans, alkali metal and zinc salts of N-substituted dithiocarbamic acids. These materials, however, have certain disadvantages which have precluded their universal acceptance as satisfactory means of stabilizing aromatic diamines. For example, the aromatic mercaptans are inoperative as stabilizers for certain aromatic diamines; the alkali metal and zinc salts of N-substituted dithiocarbamic acids tend to accelerate the oxidation of certain aromatic diamines; and the zinc aromatic mercaptides and zinc salts of aromatic mercaptans, while effective for certain aromatic diamines, are not readily commercially available and are costly to synthesize.

Other organic sulfur compounds suggested as stabilizers for aromatic diamines include carbon bisulfide, phosphorus sulfide reaction products of phenolic compounds, etc. These materials also have not been universally accepted as satisfactory stabilizers for aromatic diamines since they tend to liberate hydrogen sulfide which is extremely toxic, obnoxious and presents explosion and corrosion problems. In addition, these materials are inoperative as stabilizers of certain aromatic diamines and, in fact, tend to increase the oxidation susceptibility of such aromatic diamines.

A method has now been found by which aromatic diamines may be effectively stabilized against color degradation and which method obviates the necessity of adding an extraneous organic or inorganic compound to the aromatic diamine to effect such stabilization.

It is, therefore, an object of this invention to provide a method for the stabilization of aromatic diamines against atmospheric oxidation and against color degradation during storage.

It is another object of this invention to provide a method for stabilizing aromatic diamines against discoloration and decomposition by heat, light and air.

It is a further object of this invention to provide a method for the stabilization of aromatic diamines without the addition of extraneous chemical compounds to the aromatic diamines to induce such stabilization.

Other objects of this invention will become apparent from the description and claims which follow.

Briefly stated, aromatic diamines are stabilized against oxidation and color degradation according to this invention by heating the aromatic diamines in an atmosphere of hydrogen under pressure for a specific period of time.

The preparation of aromatic diamines may be accomplished according to the teachings of the prior art by a number of known methods. One method involves a catalytic hydrogenation of the corresponding aromatic dinitro compound to produce the diamine and another conventional method involves employing a liquid phase reactive metal-mineral acid system. The preferred method of preparing aromatic diamines commercially is by the direct reduction of an aromatic dinitro compound with hydrogen and a suitable hydrogenation catalyst. These catalytic hydrogenations are quite successful in producing high yields of the desired diamine.

This catalytic hydrogenation of aromatic dinitro compounds to produce the corresponding diamines is usually conducted in the presence of a suitable solvent. These solvents include alcohols, ethers, hydrocarbons and other oxygenated materials.

The specific conditions utilized in the catalytic reduction of aromatic dinitro compounds are, as stated above, well-known in the prior art, i.e. temperatures of from about 20° C. to about 100° C. or slightly higher are usually employed. Lower temperatures are less desirable since the speed of the reaction is markedly decreased and at temperatures greater than 100° C. undesirable side reactions such as hydrogenolysis, hydrogenation of the ring and/or polymerization may occur. Optimum temperatures and pressures of reaction may be obtained for each specific aromatic dinitro compound to be produced and the particular catalyst to be employed. In general, however, it is well-known that the reaction will progress at a satisfactory rate at temperatures within the range of about 40° C. to about 100° C.

The pressure employed in such a reaction is preferably about 25 p.s.i.g. to about 80 p.s.i.g., although pressures above or below this preferred range have been employed.

Any of the standard hydrogenation catalysts may be used in the reduction of aromatic dinitro compounds to form aromatic diamines. The preferred catalysts employed in such a reaction comprises nickel and metals of the platinum group of the periodic table, preferably palladium or platinum, either unsupported or supported on a carrier. The supported catalyst may be in the form of pellets, granules or powder. Examples of catalysts which have found particular utility in the preparation of aromatic diamines and a method for the preparation of such catalysts may be found in the following references:

Nickel on Kieselguhr—Covert and Conner, J. Am. Chem. Soc. 54, 165 (1932)
Platinum or palladium on alumina—Schwarcman, U.S. Patent 1,111,502
Plantinum black—Sabatier-Reid, Catalysis in Organic Chemistry, D. Van Nostrand Co., New York 1922
Palladium on charcoal—Mannich & Theile, Ber. Deutches Pharm. Ges. 26, 36–48 (1916)
Platinum on charcoal—Ellis, U.S. Patent 1,174,245
Raney nickel—Covert, J. Am. Chem. Soc. 54, 4116 (1952).

It is to be understood that any aromatic diamine regardless of its method of preparation, may be treated according to the process of this invention. The aromatic diamines have the general formula:

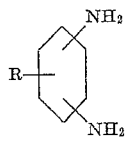

wherein R is an alkyl, alkaryl, aryl or aralkyl radical or hydrogen. Examples of aromatic diamines which may be stabilized according to the process of this invention include diaminobenzene, diaminotoluene, diamino-ethylbenzene, diaminopropylbenzene, diaminocumene, diamino-tert-butylbenzene, diamino normal butylbenzene, diamino-amylbenzene, diamino-dodecylbenzene, diamino-octadecylbenzene, biphenyl diamine, and naphthalene diamine.

It has been found that when an aromatic diamine is heated at elevated temperatures in an atmosphere of hydrogen under pressure, upon removal of the aromatic diamine from the atmosphere of hydrogen, the diamine is effectively stabilized against oxidation and color degradation.

The temperature of the treatment according to the process of this invention must be at least 200° C. and, more preferably, between about 250° C. to about 300° C. The maximum temperature which can be used in the treatment of an aromatic diamine according to the process of this invention is limited only by the decomposition temperature of the diamine being treated. In most instances, temperatures less than about 500° C. will be satisfactory in the process of this invention.

The period of time that the aromatic diamine is to be treated according to this invention is not critical. Obviously, in order to be effectively stabilized the aromatic diamine must be treated for a period of time sufficient to insure stabilization and in this respect, it has been found that if the diamine is subjected to treatment for a period of time ranging between 10 minutes to about 10 hours the material is effectively stabilized. It is most preferred in the practice of this invention to treat the diamine according to the process of this invention for a period of time ranging between about 30 minutes and about two hours.

The hydrogen pressure employed in the treatment of the diamines according to this invention in a similar manner is not critcal to the results obtained. It is to be understood, however, that in order to maintain an atmosphere of hydrogen the system must be under some pressure and it has been found that satisfactory results are obtaiend at pressures ranging between about 25 p.s.i.g. and 2500 p.s.i.g. It is most preferred, however, in the practice of this invention to utilize pressures ranging between about 1000 p.s.i.g. to about 2000 p.s.i.g.

The effective stabilization of aromatic diamines in accordance with the instant invention is a unique and unexpected result. As stated above, preparing an aromatic diamine from the corresponding aromatic dinitro compound, if the temperature is allowed to exceed about 100° C. undesirable side reactions will take place. It has been found, however, that although the aromatic diamines cannot be stabilized during their preparation since high reaction temperatures are precluded, they may be stabilized subsequent to their preparation by the use of relatively high temperatures and in the presence of hydrogen under pressure for a specified period of time. Even though the temperatures employed in the instant process far exceed the recommended temperatures to be used in preparing aromatic diamines, there is found to be no degradation of the aromatic diamine, i.e. no hydrogenolysis occurs, little or no saturation of the ring is observed, nor are there any polymeric products produced.

This invention will be further understood from the following examples which are illustrative and should not be construed as limitative.

EXAMPLE I

Seven hundred grams of dinitro amylbenzene were reduced to the corresponding diamino compound by hydrogenation in the presence of two grams of a platinum oxide catalyst at a temperature of 75° C. and 60 p.s.i.g. There was produced essentially a quantitative amount of the desired diamino compound which upon infra red analysis showed that the product was completely reduced to the diamino amylbenzene.

EXAMPLE II

A portion of the amyl diamino benzene produced in Example I was purified by distillation (B.P. 135° C. to 150° C. at 2 mm. of mercury pressure) and stored in the absence of light. This material was observed at intervals of time to determine its stability and the results of that observation are set forth in Table I below.

EXAMPLE III

A second portion of the amyl diamino benzene produced in Example I was placed in an atmosphere of hydrogen under a pressure of 1600 p.s.i.g. The temperature was increased to 255° C. and this temperature was maintained for one huor. At the end of this time the amyl diamino benzene was removed and subjected to infra red analysis. This analysis showed there was substantially no change in the product, thus indicating that no undesirable side reactions, such as ring saturation, had taken place. This material was also purified by distillation and stored in the absence of light and observed at intervals of time to determine its stability. The results of this observation are also set forth in Table I below.

EXAMPLE IV

A sample of dinitro dodecylbenzene was reduced to the corresponding diamino compound by a conventional hydrogenation procedure. There was recovered essentially a quantitative amount of the desired dodecylbenzene diamine which upon infra red analysis showed that the product was completely reduced to the diamino compound.

EXAMPLE V

A portion of the dodecylbenzene diamine produced in Example IV was purified by distillation (B.P. 170° C. to 180° C. at 2 mm. of mercury pressure) and stored in the absence of light. This material was observed at intervals of time to determine its stability and the results of such observation are set forth in Table I below.

EXAMPLE VI

A second portion of the dodecylbenzene diamine produced in Example IV was placed in an atmosphere of hydrogen under a pressure of 2250 p.s.i.g., the temperature was increased to 254° C. and this temperature was maintained for 45 minutes. At the end of this time dodecylbenzene diamine was removed and subjected to infra red analysis. This analysis showed there was substantially no change in the product, thus indicating that no undesirable side reactions such as ring saturation had taken place. This material was also purified by distillation and stored in the absence of light and observed at intervals of time to determine its stability. The results of this observation are also set forth in Table I below.

*Table I*

| Sample | Light Transmission (percent) | | | | |
| --- | --- | --- | --- | --- | --- |
| | 1 wk. | 2 wks. | 1 mo. | 6 mos. | 1 year |
| Diamine from Example II | 0 | | | | |
| Diamine from Example III | 98 | 98 | 97 | 97 | 94 |
| Diamine from Example V | 0 | | | | |
| Diamine from Example VI | 97 | | | | |

The data presented in Table I demonstrate clearly that aromatic diamines treated according to the process of the instant invention remained essentially water-white and free of oxidation products for substantial periods of time after the date of their preparation, whereas the same diamines which had not been treated according to the method of this invention turned black and transmitted no light only one week after the date of their preparation.

Various changes and modifications in the process may be made as will be apparent to those skilled in the art to which this invention pertains without departing from the spirit and intent of this invention, it, therefore, is to be understood that the present invention is not to be limited except by the scope of the appended claims.

I claim:
1. A method for stabilizing aromatic diamines against oxidation and color degradation which consists of heating the aromatic diamine at a temperature of from about 200° C. to 500° C. in an atmosphere of hydrogen under a pressure of from about 25 p.s.i.g. to 2500 p.s.i.g. for a period of time ranging from about 10 minutes to 10 hours, whereby hydrogenolysis and ring saturation do not take place, said aromatic diamines having the general formula

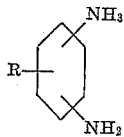

wherein R is an alkyl radical containing from 1 to 18 carbon atoms.

2. A method for stabilizing aromatic diamines against oxidation and color degradation which consists of heating the aromatic diamine at a temperature of from about 250° C. to 300° C. in an atmosphere of hydrogen under a pressure of from about 1000 p.s.i.g. to 2000 p.s.i.g. for a period of time ranging from about 30 minutes to 2 hours, whereby hydrogenolysis and ring saturation do not take place, said aromatic diamines having the general formula

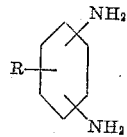

wherein R is an alkyl radical containing from 1 to 18 carbon atoms.

References Cited in the file of this patent
UNITED STATES PATENTS

| | | |
|---|---|---|
| 2,322,572 | Fisher | June 22, 1943 |
| 2,402,423 | Mason | June 18, 1946 |
| 2,697,728 | Huebner | Dec. 21, 1954 |

UNITED STATES PATENT OFFICE
CERTIFICATE OF CORRECTION

Patent No. 3,068,289                      December 11, 1962

Joseph E. Woodbridge

It is hereby certified that error appears in the above numbered patent requiring correction and that the said Letters Patent should read as corrected below.

Column 3, line 46, for "critcal" read -- critical --; line 50, for "obtaiend" read -- obtained --; line 56, after the comma, insert -- in --; column 4, line 24, for "huor" read -- hour --; column 5, lines 25 to 30, the formula should appear as shown below instead of as in the patent:

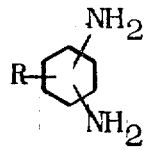

Signed and sealed this 21st day of May 1963.

(SEAL)
Attest:

ERNEST W. SWIDER                      DAVID L. LADD
Attesting Officer                     Commissioner of Patents